C. WEBER.
RESILIENT WHEEL.
APPLICATION FILED MAR. 18, 1916.
1,205,825.
Patented Nov. 21, 1916.
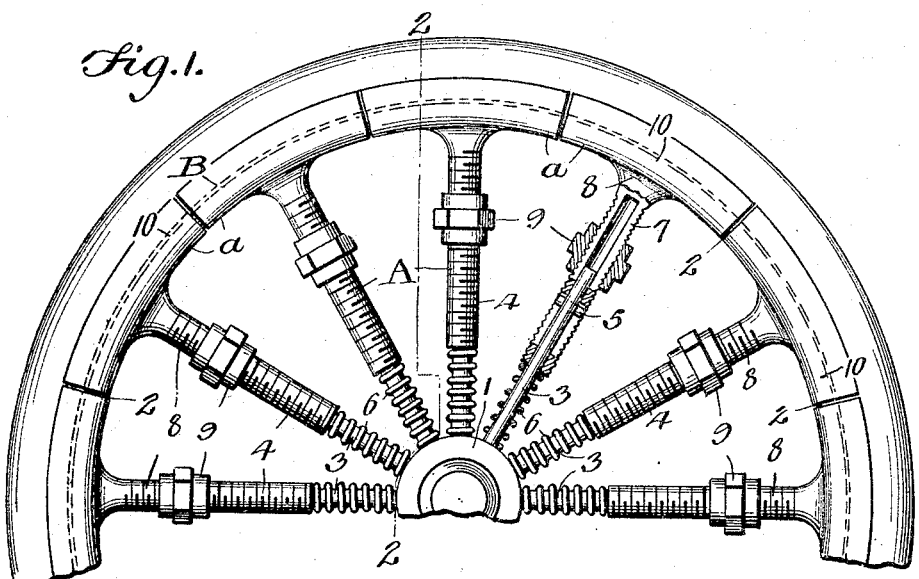
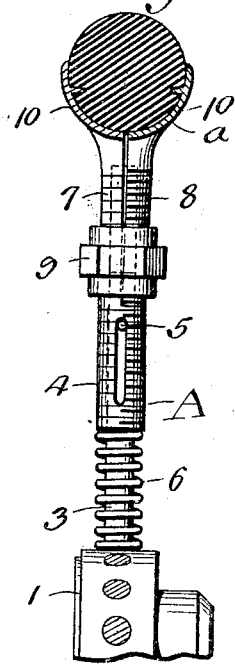
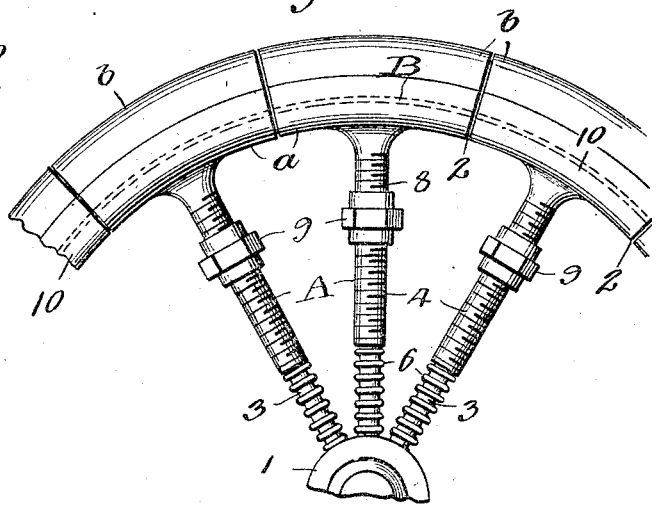

UNITED STATES PATENT OFFICE.

CHARLES WEBER, OF BLOOMINGTON, ILLINOIS.

RESILIENT WHEEL.

1,205,825.  Specification of Letters Patent.  Patented Nov. 21, 1916.

Application filed March 18, 1916. Serial No. 85,113.

*To all whom it may concern:*

Be it known that I, CHARLES WEBER, a citizen of the United States, residing at Bloomington, in the county of McLean and State of Illinois, have invented new and useful Improvements in Resilient Wheels, of which the following is a specification.

This invention relates to resilient wheels especially adapted for use upon automobiles, motor trucks and the like.

The object of the invention is to produce a wheel of novel and practical construction embodying a circular series of yieldingly supported rim sections by means of which the tire is carried, each of said rim supporting sections embodying a split rim and a split spoke section, combined with means whereby the split portions of the spoke and rim may be securely clamped in relation to each other so as to in turn clamp a portion of the tire in the rim, and whereby also the tire may be released where it is necessary to renew or repair an old tire.

One of the main objects of the invention is to dispense with the ordinary pneumatic tire and the troubles incident to the use thereof, and employ in lieu of the shock absorbing qualities of a pneumatic tire, a wheel the construction of which renders it able to absorb all ordinary road shocks and vibrations and prevent the transmission thereof to the axles and body of the vehicle.

With the above and other objects in view, the invention consists in the novel construction, combination and arrangement of parts, as herein described, illustrated and claimed.

In the accompanying drawings:—Figure 1 is a fragmentary side elevation of a vehicle wheel embodying the present invention. Fig. 2 is a radial transverse section through the same on the line 2—2 of Fig. 1. Fig. 3 is a fragmentary side elevation showing the use of a tire comprising a circular series of separable sections.

The wheel contemplated in this invention comprises, in the preferred embodiment thereof, a hub 1, a series of spokes each designated generally at A, and a rim designated generally at B and composed of a plurality of sections $a$, there being one rim section for each spoke A.

By reference to the drawings it will be observed that the rim is divided transversely at a plurality of points 2 so as to form a number of rim sections $a$ corresponding with the number of spokes. Each spoke embodies an inner telescopic spoke-forming member 3 and an outer or tubular telescopic spoke-forming member 4. The spoke-forming member 3 carries a transverse pin 5 which works in guide ways in the spoke-forming member 4 so as to prevent relative rotative movement of the spoke-forming members and hold the rim sections in longitudinal alinement with each other. A coiled expansion spring 6 is interposed between the inner end of each tubular spoke-forming member 4 and the periphery of the hub 1.

At a suitable point in the length of the tubular spoke-forming member 4 the latter is split longitudinally into two sections, one of said sections 7 being formed integrally with the member 4 while the remaining section 8 is separable from the section 7 but is held in fixed and clamped relation thereto by means of a clamping sleeve 9 which is threaded upon and rotatable around the member 4 so that by screwing the sleeve 9 inwardly, the section 8 may be separated laterally from the section 7 of the member 4 and by screwing the sleeve 9 outwardly, the sections 7 and 8 may be clamped in fixed and tight relation to each other, each of the rim sections $a$ is split longitudinally and centrally into twin sections 10, one of the sections being fixedly connected to or formed integrally with one section of the member 4 while the other section 10 of the rim bears a fixed relation to or is formed integrally with the other section of the member 4. Each of the sections 7 and 8 is preferably expanded at its point of junction with the respective section 10 of the rim so as to form a braced connection between the rim sections and the separable sections 7 and 8.

From the foregoing description, taken in connection with the accompanying drawings, it will now be understood that the wheel comprises a rim which is transversely divided at intervals into a circular series of independently yieldable sections. Each rim section being yieldably supported independently of all of the remaining sections by means of an individual spring. Any type of tire whether pneumatic or solid, of rubber or any other material may be used in conjunction with the resilient wheel and may or may not be provided with a resilient or flexible rim or annular reinforcing member along the rim surface thereof. The tire is fastened in place with respect to each of the rim sections by separating or closing the longitudinally separable portions of each rim section. Also, if desired, the tire itself may be composed of sections each approximately of the same length as the rim section by which it is carried, such an arrangement being illustrated in Fig. 3 wherein it will be observed that the tire is composed of a plurality of sections $b$ the adjacent extremities of which are normally out of contact with each other.

It is preferred to provide each of the rim sections 10 with an interior longitudinally extending rib 11 for obtaining a better grip and hold on the tire, especially where the tire is made up of sections such as are shown in Fig. 3.

Having thus described my invention, I claim:—

In a resilient wheel, the combination of a hub, spokes radiating from said hub and each embodying telescopic members, means for yieldingly sustaining those members of the telescopic spokes which have a radial movement in relation to the hub, each movable spoke member being longitudinally split for a portion of its length into sections one of which is less than the full length of the complete movable spoke member and is laterally separable in relation thereto, a sleeve threaded upon the last named spoke member and adjustable inwardly and outwardly for the purpose of clamping and releasing the longitudinally divided sections of said spoke members in relation to each other, and a rim embodying a plurality of sections transversely divided from each other and each longitudinally split into sections each having a fixed relation to one of the separable sections of the movable member of each telescopic spoke.

In testimony whereof I affix my signature in presence of two witnesses.

CHARLES WEBER.

Witnesses:
　Lynn T. Coley,
　C. L. Utesch.

Copies of this patent may be obtained for five cents each, by addressing the "Commissioner of Patents, Washington, D. C."